Figure 1:
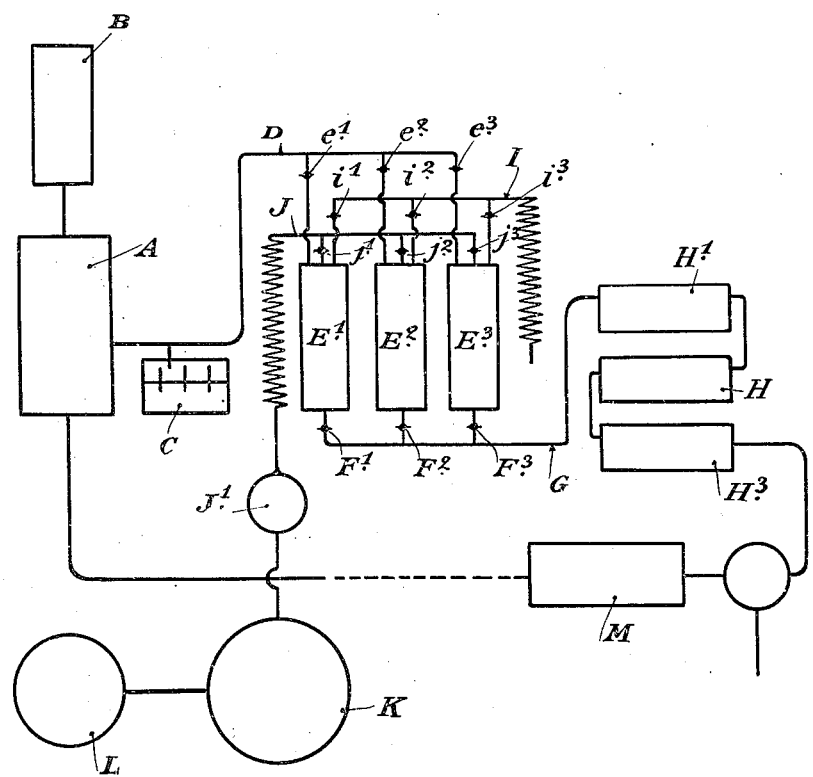

May 13, 1930.  A. JOSEPH  1,758,796
PROCESS FOR PRODUCING LIQUID FUELS
Filed July 11, 1927  2 Sheets-Sheet 1

Inventor
Alfred Joseph
By
Cameron, Kirkam & Sutton
attorneys

May 13, 1930.  A. JOSEPH  1,758,796
PROCESS FOR PRODUCING LIQUID FUELS
Filed July 11, 1927   2 Sheets-Sheet 2

Inventor
Alfred Joseph
By
Cameron, Kirkam & Sutton
Attorneys.

Patented May 13, 1930

1,758,796

UNITED STATES PATENT OFFICE

ALFRED JOSEPH, OF PARIS, FRANCE, ASSIGNOR TO SOCIETE INTERNATIONALE DES PROCEDES PRUDHOMME HOUDRY, OF PARIS, FRANCE, A LIMITED JOINT-STOCK COMPANY

PROCESS FOR PRODUCING LIQUID FUELS

Application filed July 11, 1927, Serial No. 204,887, and in France July 21, 1926.

Processes have heretofore been proposed for the conversion into synthetic liquid fuels of gases derived from the distillation of combustibles or other starting materials of low value (lignites, peats, shales, tars, heavy oils and the like).

These processes include, following the operation of gasification—in an apparatus wherein the distillation gases are enriched with hydrogen by additional gases such as residual gases from a preceding operation and water gas manufactured with the aid of semi-cokes derived likewise from preceding operations—a purification, wherein the gases are for the major part freed from their impurities and particularly from sulphur, before they are submitted to methodical catalysis. The purification is itself a kind of preliminary catalysis; it operates in the presence of metal oxides such as oxides of nickel for example which retain the sulphur in the state of nickel sulphide, with the liberation of nascent hydrogen.

At the end of a given time, the metals of the purifying oxides become sulphuretted to the point at which it becomes imperative to regenerate them.

For this purpose, it has already been proposed to make use of a current of air or a current of water gas, and it has been indicated that it is preferable to pre-re-heat the regenerative agent.

In these known processes, for the regeneration of the purifiers, the water gas serves exclusively for the formation, with the sulphur of the metal sulphides, of sulphuretted hydrogen.

The applicant has recognized that in certain cases and at a certain stage of the manufacture of the liquid fuels, the regenerative water gas can be utilized more completely.

The subject of the present invention is a purifying process, comprising a regeneration of the purifying agents by means of water gas, which not only enables a complete utilization of the regeneration gas, but ensures, moreover, a more uniform progression of the complete cycle of conversion of the distillation gases into synthetic liquid fuels. The invention also comprises a particular apparatus for carrying out the new process.

According to the invention, the purifiers arranged between the gas generating apparatus and the catalyzers, and organized in such a manner as to operate alternatively with a period of purifying activity and a period of regeneration, are regenerated by the consecutive passages of a current of hot air and a current of heated water gas. The current of air effects the production of sulphurous acid which is eliminated, and at the same time it leaves the metal purifier, such as nickel for example, in the form of an oxide too fixed for it suitably to serve the role of purifier, that is to say of a decomposing agent for sulphuretted hydrogen.

The regeneration by air alone, for the reason which has just been indicated, would be unsuitable. If, according to the invention, it is followed by a regeneration by means of water gas, this would play, in this operation following the regeneration by air, an extraordinarily important and advantageous role, and all the elements of this gas remain utilized in the cycle; it first drives off the air remaining in the purifier; then, substituting itself therefor, it brings the purifier to the desired temperature; at the same time it will convert the too stable metal oxide, insufficiently active (nickel oxide NiO for example), into a sub-oxide $Ni_2O_3$ or $Ni_3O_4$ perfectly adapted to decompose sulphuretted hydrogen, that is to say to retain the sulphur and to liberate the hydrogen.

It will even generally happen that the water gas will bring back to the metallic state the oxides unadapted for the purification. The nascent hydrogen set at liberty by the decomposition of the $H_2S$ will be able, in such case, to act on the gas to be purified which, in the continuous progression of the purification, will be passed through the purifier; it will fix itself by preference on the hydrocarbons of the distillation gases, in order to hydrogenate them.

From this an appreciable benefit results, in view of the nascent hydrogen, derived from the decomposition of the $H_2S$, instead of having to have a reducing action on the purifying oxides, will become entirely available for the synthesis of the hydrocarbons.

The water gas, having played the role which has just been indicated, will not moreover be entirely evacuated from the purifying apparatus. Certainly a portion of its hydrogen will have served to convert the metal oxides, by reduction; but the hydrogen remaining and the carbon monoxide re-enter into the cycle. The current of water gas then continues to traverse the regenerated purifying element, and serves now exclusively as an enriching agent with all its constituent elements, driving before it the hydrogen remaining and the carbon monoxide from the mass of water gas which has just served for the regeneration. In this manner, the water gas for enrichment, in continuing to play its role, is purified.

In practice, the plant for the purification in series by a current of air followed by a current of water gas, will preferably be established as shown in the accompanying drawing, in which Fig. 1 is a diagram of the whole of a plant for the purification of semi-products according to the Prudhomme cycle arranged for the operation of the new process.

Figure 2:
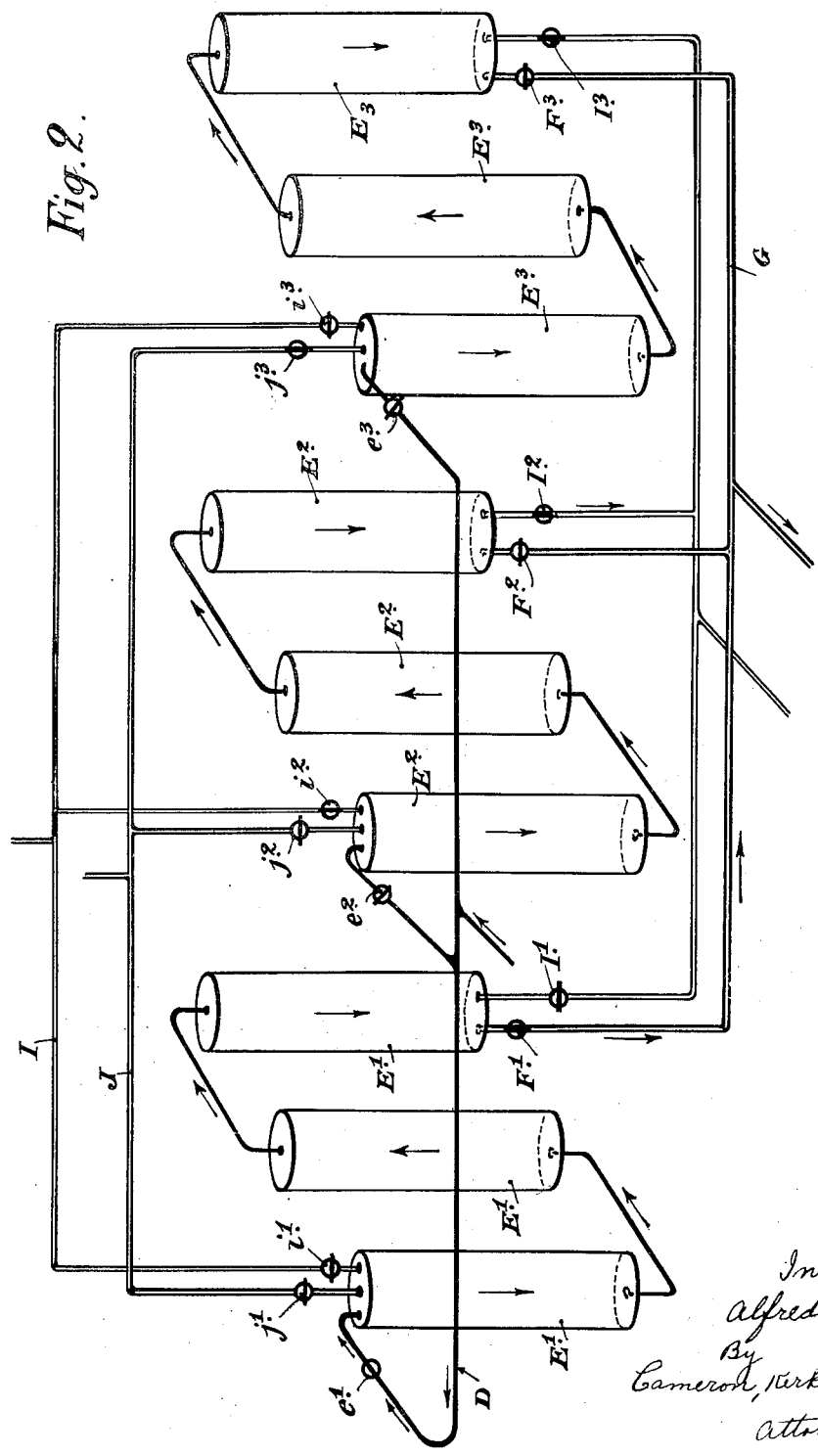

Fig. 2 is a perspective diagram of three batteries of purifiers and pipe connections.

In Fig. 1, A denotes apparatus for generating the gases intended to be converted into synthetic liquid fuels. This apparatus may be, for example, a retort for the distillation of poor combustibles such as lignites, peats, or shales, which will be introduced into the said retort after passage through a drying apparatus B.

The distillation of the gases derived from the combustible will be facilitated or initiated by the action of a current of additional gases, such as residual gases from a preceding operation and derived from the last element M of the entire plant which enables the production of the semi-products, which will be in another cycle, converted into a final product utilizable as a liquid fuel.

The entire mass of gases coming from A charged with useful tar vapours distilling below about 400° C. (the others having been separated by condensation in a dephlegmator C) arrives, by virtue of the maintenance of a suitable temperature in the pipe D, at the batteries of purifiers. Each of these batteries comprises three series of elements $E^1$, $E^2$, $E^3$, charged with a purifying catalyzer agent such as nickel oxide for example. These series will act successively and alternatively:

(a) With an active purifying period,
(b) With a period of pre-regeneration by a current of air, with evacuation of the sulphurous acid,
(c) With a period of subsequent regeneration by water gas with evacuation of the air remaining and the partial or total reduction of the too fixed metal oxide, for its conversion into a sub-oxide more suitable for a purifying catalyzer.

The gases to be purified pass, in their normal progression, for example, first into the series of purifiers $E^1$, having a number of elements variable at will, the inlet cock $e^1$ being open, and leave by the pipe G, past the cock $F^1$, for passing to the catalyzers $H^1$, $H^2$, $H^3$. During this time the cocks $e^2$, $e^3$ and $F^2$, $F^3$ are closed.

Whilst the purification occurs in the elements $E^1$ wherein the gases enter by the open cock $e^1$, the access of gas to be purified to the elements $E^2$ and $E^3$ is closed by the cocks $e^2$, $e^3$.

The elements $E^2$ and $E^3$ are in the course of regeneration. The first stage of regeneration occurs for example in the elements $E^2$, wherein the air, heated in a coil for example, arrives past an open cock $i^2$; the cocks $i^1$, $i^3$ for the inlet of hot air to the elements $E^1$ and $E^3$ are during this closed. The air charged with sulphurous acid and drawn off by a suitable apparatus, leaves the last element $E^2$, past the cock $I^2$, then open; the corresponding cocks $I^1$ and $I^3$ of the two other series of elements are closed during this time, the sulphurous acid being finally collected in a vat for the recuperation of the sulphur.

During this time, the elements $E^3$ effect the second stage of the regeneration. Water gas, derived from a pipe J, provided with a counter $J^1$, connected to a gasometer K, charged by a gasogene L, is admitted by the cock $j^3$ then open (the cock $j^2$ being shut) into the elements $E^3$, which have just been subjected to the air blast. The air remaining in the elements $E^3$ is driven out by the water gas which substitutes itself therefor. The combustion of the sulphur, its conversion into sulphurous acid, has created in these elements an increase of temperature, which is compensated, by a corresponding decrease, by the passage of the water gas. Whilst substituting itself for the evacuated air, the water gas effects, by its hydrogen, a reduction of the too fixed oxide (NiO for example) which the purification by air leaves, and the conversion, as mentioned above, of this oxide into a sub-oxide ($Ni_2O_3$ or $Ni_3O_4$) and even into the metal (Ni).

When the air has been evacuated, the cock $I^3$ by which the air leaves is closed, and the cock $F^3$ by which the mixture of purified gas leaves is opened. Then the cock $e^3$ for the admission of mixture to be purified can be opened.

The elements $E^3$ will then be in the purification period.

However the purifying agents will be sulphuretted in the elements $E^1$. The cocks $e^1$ and $F^1$ are now closed, and at the same time the air admission and outlet cocks $i^1$ and $I^1$ are opened.

During the same time, the stage of regeneration by hot air will have terminated in the elements $E^2$, and the second stage can be proceeded with, that is to say the regeneration by the water gas. It will suffice, for this purpose to close the cocks $i^2$ and $I^2$ and open the cocks $j^2$ and $F^2$.

The cycle described then recurs, the elements $E^1$, $E^2$, $E^3$ being alternatively in the period of activity, of pre-regeneration by hot air, and of subsequent regeneration by water gas.

It is obvious that an automatic and periodic control of the cocks could be provided.

Claims:

1. In a process of the type wherein hydrocarbon products to be treated are vaporized, subjected to catalytic purification to remove sulphur therefrom, and then subjected to hydrogenation with addition of hydrogen-containing gas thereto, the steps of passing a current of air through a contaminated purifying element to remove sulphur therefrom, then passing a current of water gas through said purifying element to convert the catalytic material to an active state, and then passing said vaporized products to be hydrogenated through said purifying element while continuing said current of water gas, thereby retaining the portion of said gas not employed in the conversion of said catalytic material for enriching said products and adding additional enriching gases thereto.

2. In a continuous process of the type wherein hydrocarbon products are subjected to a cycle of treatment including vaporizing said products, subjecting said products to catalytic purification to remove sulphur therefrom, and then hydrogenating said products with addition of hydrogen-containing gas thereto, and wherein spent purifying elements containing contaminated purifying material are regenerated while other purifying elements are employed in said cycle to purify said products, the steps of passing a current of air through a spent purifying element to remove sulphur from the purifying material, then passing a current of water gas through said purifying element to reduce the purifying material to an active state and to evacuate the remaining air, and then restoring said purifying element to said cycle of treatment and passing said products therethrough while continuing said current of water gas, thereby retaining the portions of said gas not employed in the reduction of said catalytic material for enriching said products and adding water gas to said products.

In testimony whereof I have signed this specification.

ALFRED JOSEPH.